Patented Mar. 31, 1942

2,277,733

UNITED STATES PATENT OFFICE 2,277,733

DIELECTRIC MATERIAL AND METHOD OF MAKING THE SAME

Eugene Wainer and Norman R. Thielke, Niagara Falls, N. Y., assignors to The Titanium Alloy Manufacturing Company, New York, N. Y., a corporation of Maine No Drawing. Application April 27, 1939, Serial No. 270,462

5 Claims. (Cl. 106—46)

This invention relates to ceramic dielectric materials and the method of making the same. More particularly it relates to such materials in which titanium dioxide is the predominant constituent.

In the past, dielectric spacers for condensers have been constructed out of a variety of materials. In the variable type of condenser the spacer ordinarily consists of air or some similar fluid material which has a comparatively low dielectric constant. In fixed condensers, on the other hand, it is possible to employ materials of a much higher dielectric constant. It is known, for example, that titanium dioxide has an extremely high dielectric constant. The constant for crystalline $TiO_2$ is 89 when measured along its transverse axis and 173 when measured along its longitudinal axis. The desirable qualities of titanium dioxide as a dielectric material have therefore led to considerable research on its utility. Besides a high dielectric constant, however, other qualities are necessary in commercial condensers of the fixed type. These other qualities are a good dielectric strength, high resistivity, low power factor, and a minimum amount of change of dielectric constant and power factor with change in temperature. A combination of all these qualities to the most satisfactory degree results in the best condenser dielectric. This has become of increasing importance in recent years in the use of fixed condensers in radio and television work, where enormously high frequencies are employed. The specification of condensers to be used in this field are subject to the most rigid qualifications.

One of the forms under which titanium dioxide is commercially used is that known as heavy grade titanium dioxide. This material, formed by calcination at high temperatures (e. g. 1350° C.), is in many respects extremely satisfactory, and has been suggested for impregnation in paper or for mixing with synthetic resins for dielectric purposes. In this form, however, it has a relatively high power factor which renders it unsuitable for many purposes. In the preparation of heavy grade titanium dioxide, furthermore, it is necessary to process the naturally occurring titanium bearing mineral, such as rutile, brookite, and others, and to purify the same. Hitherto, it has been impossible to use the naturally occurring minerals directly for the production of condenser dielectrics.

It is therefore an object of this invention to produce a titanium dioxide ceramic of improved dielectric characteristics. It is a further object to utilize directly naturally occurring rutiles in the formation of ceramic bodies of excellent dielectric characteristics. It is a further object to provide a method for forming ceramic bodies of excellent dielectric characteristics. Other objects will appear hereinafter.

These objects are accomplished by employing as a dielectric titanium dioxide of a certain specified degree of purity. A ceramic body containing such titanium dioxide is fired at a temperature at which maximum vitrification occurs but below the temperature at which crystallization sets in. To secure the best results the titanates of barium, and/or strontium and/or calcium are included in the ceramic body.

In accordance with this invention it has been found that the presence of certain impurities in titanium dioxide renders it less desirable for use as a condenser dielectric. On the other hand, if these impurities are present in less than a certain maximum amount, a dielectric of suitable characteristics is obtained. The undesirable impurities are: silicon, zirconium, aluminum, phosphorus, iron, copper, alkali metals, manganese, vanadium, cobalt and nickel. Of these the last eight mentioned are the most undesirable. The total quantity of iron, copper, alkali metals, manganese, vanadium, cobalt and nickel (calculated in the form of oxides) should not be greater than 1%. The quantity of phosphorus (in the form of $P_2O_5$) should not be greater than 0.1%. Aluminum (calculated as alumina) should not be present to an extent greater than 3%, and silicon (calculated as silica) plus zirconium (calculated as zirconium silicate, $ZrSiO_4$) should not amount to more than 5%.

Surprisingly enough it has now been found that certain naturally occurring rutiles have these characteristics. These rutiles at first sight appear to be highly impure, since they are mixed with greater or lesser quantities of zircon, chromite, quartz, ilmenite, cassiterite, apatite, rare earth minerals, and others. These impurities, however, are mostly associated with rutile merely in the form of a mechanical mixture, and are not included in the crystal structure of the rutile grains. They may be easily removed merely by mechanical means, such as by washing and by the use of magnets, electrostatic machines and gravity tables. This mechanical purification in no way alters the crystal structure of the rutile, and has no effect on the small amount of impurities contained within such crystal structure. Other than this mechanical purification, the only treatment of the rutile necessary preparatory to firing is grinding to reduce the particle size. The lack of necessity for a complicated treatment renders these rutiles economically much more suitable than the high grade synthetic titanium dioxides on the market. In general, the dielectric qualities of ceramics prepared from such rutiles are only slightly inferior, as will be shown hereafter, to the qualities of similar ceramics prepared from the more highly purified synthetic materials. In some cases, it is even true that the rutile ceramic will be superior to the synthetic ceramic. For example, in Example 7 below, the substitution of heavy grade titanium dioxide (described below) for rutile will cause the power factor to increase almost 900%.

To secure the best results, it is important, of course, that the rutile selected does not contain greater quantities of impurities within its crystal structure than the amounts specified above. It is also possible to employ naturally occurring brookite or anatase of the required grade, mechanically purified as above.

Other than these naturally occurring minerals, other types of titanium dioxide may be used in the practice of this invention. Titanium dioxide of pigment grade, for example, is ordinarily of the required degree of purity. Its method of preparation, however, is such that it possesses a very low density (due to a very small particle size), so that upon firing to form a ceramic body it shrinks to such an extent (50% or more) that it is extremely difficult to control the ultimate dimensions of the body. It is therefore preferable to employ titanium dioxide of higher density.

A suitable material of this character is that commercially known as heavy grade titanium dioxide, which may be prepared by calcining pigment grade titanium dioxide at a temperature of approximately 1350° C. Titanium dioxide of suitable density may also be prepared by recrystallizing from mixtures with suitable fluxes, such as molten nitre cake ($NaHSO_4$). This is accomplished, for example, by heating equal parts of $TiO_2$ and $NaHSO_4$ to a temperature of 600° C., where it is maintained for about one hour. The temperature is then raised to between 700° and 800° C. until the mass solidifies, whereupon the temperature is again raised to between 850° and 950° C. in order to melt the mass. Heating at the latter temperature is continued until the fluid mass starts to thicken, at which point it is poured, cooled, broken up, and leached with water in order to remove soluble sodium salts.

In addition to impurities, the particle size is of importance in securing the best results. Materials containing particles of a lower maximum size (i. e. finer particles) are more sutable for several reasons. They are much easier to control on firing; the values obtained are more uniform; the temperature range of satisfactory vitrification is broadened; there is less tendency towards crystallization; there is less porosity; and the effect of impurities is minimized. As a result, the dielectric characteristics are considerably improved.

The dielectric characteristics are also considerably improved by adding to a titanium dioxide base a minor quantity of either barium, strontium or calcium titanate, or any mixture thereof. Of these, the best are barium titanate and strontium titanate. In general, the quantity of such titanate is preferably between 3% and 20% of the entire ceramic composition. Amounts below 3% are relatively ineffectual and amounts above 20% have the following disadvantages: higher shrinkages are produced; difficulty of maintaining proper purity and uniformity, due to the fluxing action of the titanates; difficulty of preventing warpage; development of gas porosity due to bubbling; and sometimes an adverse effect on the dielectric constant. The particle fineness of the barium, strontium, or calcium titanate should be comparable to that of the titanium dioxide base.

Although it is possible to use initially a compound of barium, strontium or calcium other than the titanates but which will react to form the corresponding titanates at firing temperatures, it is not desired to do so for the reason that such reaction usually involves the evolution of gas. For example, barium oxide exposed to the air will form barium carbonate, which at high temperatures will react to form barium titanate with the evolution of carbon dioxide. The evolution of gas causes a very undesirable bubbling or gas porosity in the ceramic, which cannot be entirely removed even upon prolonged firing. Such porosity renders the ceramic very undesirable for dielectric purposes.

In utilizing any of these materials, to secure the best results it is necessary to fire them at a certain predetermined temperature. This temperature varies with the specific ceramic composition utilized, particularly with reference to the added constituents and the purity of the titanium dioxide used, and is that temperature at which maximum vitreous structure is evident and just before the definite onset of crystal growth. The exact point can be determined by suitable test pieces, and has been found to be between 2250° and 2450° F. for the ceramic compositions utilized in the present invention. It has been found, in accordance with this invention, that accurate control of the firing temperature produces bodies of the best dielectric characteristics. Below the temperature at which maximum vitreous structure is obtained, the bodies are porous and exhibit low resistivities and high power factors, particularly in humid atmospheres. Above the temperature at which crystal growth begins, the dielectric strength and the dielectric constant falls.

In firing such compositions it is normally desired to increase the temperature relatively gradually until the peak temperature is reached and similarly to cool the body relatively gradually, although the cooling may be carried out somewhat more quickly than the heating. By using care in these steps more uniform bodies are obtained, and there is less tendency to crack or warp.

Having described the invention generally, the following examples are now given:

The titanium dioxide utilized in the various examples show the following analyses:

TABLE I

|  | Heavy grade $TiO_2$ | Rutile A | Rutile B |
|---|---|---|---|
| $TiO_2$ | 97.8 | 95.3 | 94.3 |
| $SiO_2$ | 1.56 | 1.92 | 3.78 |
| $ZrSiO_4$ |  | 1.76 | 1.06 |
| $Fe_2O_3$ | 0.038 | 0.168 | 0.175 |
| $Al_2O_3$ | 0.40 | 0.60 | 0.40 |
| $CaO$ | 0.03 | 0.03 | 0.03 |
| $MgO$ | 0.04 | 0.007 | 0.01 |
| $MnO_2$ | 0.004 | 0.002 | 0.001 |
| $P_2O_5$ | 0.06 | 0.03 | 0.03 |
| $Cr_2O_3$ |  | 0.002 | 0.001 |
| $Na_2O$ |  |  |  |
| $BaO$ |  |  |  |
| $CuO$ | 0.001 | 0.001 | 0.001 |
| $B_2O_3$ | 0.001 | 0.001 | 0.001 |
| $V_2O_5$ | 0.001 | 0.15 | 0.20 |

They are prepared as follows:

*Heavy grade $TiO_2$*

Pigment grade $TiO_2$ of suitable purity is heated, without other preparation, to a temperature of 1350° C., and maintained there for several hours. The resulting material shows well-defined crystals of an average particle size of about 2 microns.

Rutile A

Australian sand deposits containing a suitable quantity of high grade rutile are first freed from quartz, sea shells, calcite, organic dirt, etc., by gravity separation over a wet Wilfley table. The use of fresh water serves to eliminate soluble impurities, such as salt. The concentrate is then dried and passed over a low power magnet which removes magnetic minerals, such as chromite, ilmenite, magnetite and to a certain extent a portion of any monazite that may be present. The concentrate, consisting chiefly of a mixture of zircon and rutile grains, is then passed over a high power induction magnet, which separates about ½ to ⅔ of the zircon from the rutile, leaving a pure zircon fraction and a rutile fraction containing considerable zircon. The rutile fraction is then passed over an electrostatic separator, activated by a modified Wimshurst generator and controlled by gas discharge tubes. By means of successive passages over the electrostatic separator a rutile of the required degree of purity is easily obtained. This pure concentrate is then suitably comminuted by grinding in a porcelain lined ball mill (or in iron equipment followed by acid leach to remove iron introduced in milling), to particle sizes varying from 0.5 to 40 microns.

Rutile B

This material is prepared in the same general fashion as rutile A except that the grinding is carried to particle sizes varying from 0.5 to 8 microns.

Example 1

1 kilogram of heavy grade titanium dioxide is thoroughly mixed with 10% by weight of 5% gelatin solution and the mixture passed through a 20 mesh screen. 125 grams of the batch is placed in the cavity of a steel mold of 4 inches in diameter and the specimen formed under a pressure of 1200 pounds per square inch. The body is then fired according to the following schedule: it is brought to the peak temperature (2300° F.) at the rate of 50° F. per hour. It is held six hours at the peak temperature, the temperature then decreased at the rate of 50° F. per hour to 1200° F., then at the rate of 100° F. per hour from 1200° F. to 800° F., and the furnace then shut down. A close textured body about 0.5 cm. thick and 8.76 cms. in diameter is produced.

Example 2

The same procedure is followed as in Example 1 except that rutile B is used in place of heavy grade titanium dioxide, and that the peak temperature employed is 2400° F.

Example 3

900 grams of heavy grade titanium dioxide and 100 grams of barium titanate are thoroughly mixed by ball milling with water, dried and disintegrated. To this mixture 10% by weight of 5% gelatin solution is added and thoroughly incorporated and the batch passed through a 20 mesh screen. 125 grams of the batch is placed in the cavity of a steel mold 4 inches in diameter and the specimen formed under a pressure of 1200 pounds per square inch. The body is then fired according to the following schedule: it is brought to a temperature of 1800° F. at the rate of 50° F. per hour and then at the rate of 100° F. per hour from 1800° F. to the peak temperature (2300° F.). The body is held at the peak temperature for six hours. The temperature is then decreased at the rate of 100° F. per hour to 1800° F. and the furnace then shut down. A close textured body about 0.5 cm. thick and 8.68 cms. in diameter is produced.

Example 4

The same procedure is followed as in Example 3 except that rutile A is used in place of heavy grade titanium dioxide, and that the peak temperature employed is 2350° F.

Example 5

The same procedure is followed as in Example 3 except that strontium titanate is used in place of barium titanate and that the firing schedule followed is as in Example 1.

Example 6

The same procedure is followed as in Example 5 except that rutile B is used in place of heavy grade titanium dioxide, and that the peak temperature employed is 2400° F.

Example 7

The same procedure is followed as in Example 4 except that calcium titanate is used in place of barium titanate, and that the peak temperature employed is 2400° F.

Electrical and shrinkage measurements were made on these bodies and exhibited the results shown in Table II (at 20°–25° C. and 50%–60% relative humidity). Resistivity (Resist.) was measured at intervals of one, two and three minutes after the current was initially applied and is given in megohm-centimeters. A current of 90 volts was used. The dielectric constant (K) and the power factor (PF) were measured at frequencies of 1,000,000 cycles per second with approximately 35% modulation at 20 volts input. In each case the weighted average for a number of test pieces is given, the number of pieces tested being from 3 to 6.

TABLE II

| Example No. | Shrinkage | Resist. 1 min. | Resist. 2 min. | Resist. 3 min. | K | PF |
|---|---|---|---|---|---|---|
| | Percent | | | | | Percent |
| 1 | 13.6 | 3,648,300 | 4,900,000 | 6,080,700 | 104.9 | 0.07 |
| 2 | 10.8 | 120,120 | 128,250 | 132,850 | 90.0 | 0.10 |
| 3 | 14.4 | 9,920,000 | 11,100,000 | 12,070,000 | 88.9 | 0.02 |
| 4 | 11.2 | 6,550,000 | 8,200,000 | 10,000,000 | 75.4 | 0.04 |
| 5 | 12.7 | 19,400,000 | 26,000,000 | 29,200,000 | 106.7 | 0.11 |
| 6 | 11.4 | 7,580,000 | 9,856,250 | 11,392,000 | 84.1 | 0.075 |
| 7 | 11.4 | 370,000 | 382,000 | 426,000 | 95.7 | 0.04 |

The dielectric strength was not measured, but in all cases was excellent and well within the commercially practical range.

The change in power factor and dielectric constant with increase in temperature is shown in Tables III and IV. Measurements in this case were made only on the best sample test piece in each series. Although the measurements were made up to 1500° C., temperatures above 75° C. are not usually encountered in practice, especially in radio and television work. Therefore the figures above 75° C. are relatively unimportant.

TABLE III

*Power factor (percent)*

| Temperature | Example number | | | | | | |
|---|---|---|---|---|---|---|---|
| | 1 | 2 | 3 | 4 | 5 | 6 | 7 |
| 20° C | 0.06 | 0.05 | 0.00+ | 0.025 | 0.02 | 0.01 | 0.05 |
| 40° C | 0.07 | 0.05 | 0.02 | 0.05 | 0.05 | 0.04 | 0.08 |
| 50° C | 0.07 | 0.07 | 0.03 | 0.05 | 0.05 | 0.04 | 0.09 |
| 75° C | 0.07 | 0.10 | 0.03 | 0.07 | 0.05 | 0.04 | 0.10 |
| 100° C | 0.07 | 0.13 | 0.03 | 0.09 | 0.06 | 0.05 | 0.11 |
| 110° C | 0.07 | 0.14 | 0.03 | 0.10 | 0.07 | 0.05 | 0.12 |
| 125° C | 0.08 | 0.18 | 0.03 | 0.11 | 0.10 | 0.055 | 0.13 |
| 135° C | 0.09 | 0.20 | 0.04 | 0.12 | 0.12 | 0.07 | 0.14 |
| 150° C | 0.10 | 0.22 | 0.03 | 0.13 | 0.15 | 0.08 | 0.16 |

TABLE IV

*Dielectric constant*

| Temperature | Example number | | | | | | |
|---|---|---|---|---|---|---|---|
| | 1 | 2 | 3 | 4 | 5 | 6 | 7 |
| 20° C | 106.8 | 92.9 | 90.6 | 93.8 | 111.5 | 89.5 | 97.4 |
| 40° C | 105.5 | 90.9 | 88.5 | 92.1 | 109.8 | 87.5 | 96.4 |
| 50° C | 105.2 | 90.4 | 88.3 | 91.4 | 109.3 | 87.0 | 95.6 |
| 75° C | 103.9 | 89.3 | 86.7 | 89.5 | 106.2 | 85.2 | 93.4 |
| 100° C | 101.8 | 87.6 | 85.8 | 88.3 | 106.0 | 84.0 | 92.2 |
| 110° C | 100.5 | 86.7 | 85.0 | 87.7 | 103.6 | 82.9 | 91.3 |
| 125° C | 98.9 | 85.2 | 83.9 | 86.4 | 101.7 | 82.0 | 90.3 |
| 135° C | 98.4 | 84.5 | 83.4 | 85.9 | 100.6 | 81.2 | 89.5 |
| 150° C | 97.5 | 83.7 | 82.9 | 85.0 | 99.3 | 80.5 | 88.5 |

It will be seen from the above tables that the dielectric characteristics of the ceramic materials in accordance with this invention are excellent. In all cases, except Examples 2 (rutile alone) and 7 (rutile plus calcium titanate), the resistivities are above 1,000,000 megohm-centimeters. The dielectric constant is well over 70 in every case, and the power factor well under 0.15%. In contrast to this, the best mica condensers, although resistivities and power factors are satisfactory, have dielectric constants not higher than 10. Paper condensers, to have good resistivity, must be relatively free from moisture, and often have power factors exceeding 1% and dielectric constants below 3. In addition, these extremely satisfactory dielectric characteristics of the present ceramic dielectrics are changed very slightly with temperature. With some, the change over a wide range is nil (i. e. the curve is flat), which is a very desirable quality in radio and television work.

In addition to these general improved characteristics, the addition of barium, strontium or calcium titanates produces results not obtainable by the addition of other materials. For example, a ceramic dielectric produced in accordance with Example 4, except that magnesium titanate is substituted for barium titanate, shows a resistivity below 800 megohm-centimeters, a dielectric constant of 69.5 and a power factor of 0.61%.

As many variations are possible within the scope of this invention, it is not intended to be limited except as defined by the appended claims.

We claim:

1. In the method of preparing a fired ceramic dielectric material, the steps which comprise mechanically purifying naturally occurring rutile, and incorporating said purified rutile into a body containing less than 1% total oxides of iron, copper, alkali metals, manganese, vanadium, cobalt and nickel, less than 0.1% $P_2O_5$, less than 3% alumina, and less than 5% total silica and zirconium silicate, and then firing said body to form a ceramic mass.

2. A ceramic dielectric material comprising a fired ceramic body of maximum vitreous structure and substantially free of crystalline growth, said body containing a major portion of substantially pure titanium dioxide, said body containing less than 1% total oxides of iron, copper, alkali metals, manganese, vanadium, cobalt and nickel, less than 0.1% $P_2O_5$, less than 3% alumina, and less than 5% total silica and zirconium silicate.

3. In the method of preparing a fired ceramic dielectric material, the steps which comprise mechanically purifying naturally occurring rutile, incorporating said purified rutile into a body containing less than 1% total oxides of iron, copper, alkali metals, manganese, vanadium, cobalt and nickel, less than 0.1% $P_2O_5$, less than 3% alumina, and less than 5% total silica and zirconium silicate, and firing said body at such a temperature as to obtain maximum vitreous structure with substantially no crystalline growth.

4. A method of forming ceramic dielectric material comprising gradually heating a mixture containing finely divided titanium dioxide, said mixture containing less than 1% total oxides of iron, copper, alkali metals, manganese, vanadium, cobalt and nickel, less than 0.1% $P_2O_5$, less than 3% alumina, and less than 5% total silica and zirconium silicate, to a maximum temperature such as to obtain maximum vitreous structure with substantially no crystalline growth, maintaining said maximum temperature for a substantial period of time, and gradually cooling the resulting fired ceramic.

5. The method of claim 4 characterized in that said maximum temperature is between 2250° and 2450° F.

EUGENE WAINER.
NORMAN R. THIELKE.